United States Patent
Kotzin

(10) Patent No.: US 7,339,909 B2
(45) Date of Patent: Mar. 4, 2008

(54) APPARATUS AND METHOD FOR OPERATING A COMMUNICATION DEVICE ON TWO NETWORKS

(75) Inventor: Michael D. Kotzin, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 526 days.

(21) Appl. No.: 10/903,819

(22) Filed: Jul. 30, 2004

(65) Prior Publication Data

US 2006/0025138 A1  Feb. 2, 2006

(51) Int. Cl.
*H04Q 7/00* (2006.01)
(52) U.S. Cl. .............. 370/331; 370/338; 370/328; 455/550.1; 455/532.1
(58) Field of Classification Search ............. 370/331, 370/328, 338; 455/437, 552.1, 550.1
See application file for complete search history.

(56) References Cited

U.S. PATENT DOCUMENTS

| | | | |
|---|---|---|---|
| 2004/0108465 A1* | 6/2004 | Bakker et al. | 250/492.1 |
| 2004/0114553 A1* | 6/2004 | Jiang et al. | 370/328 |
| 2004/0137901 A1* | 7/2004 | Hamasaki et al. | 455/436 |
| 2004/0218575 A1* | 11/2004 | Ibe et al. | 370/338 |
| 2005/0059400 A1* | 3/2005 | Jagadeesan et al. | 455/436 |
| 2005/0197061 A1* | 9/2005 | Hundal | 455/41.2 |

* cited by examiner

*Primary Examiner*—Danh Le
(74) *Attorney, Agent, or Firm*—Gary J. Cunningham

(57) ABSTRACT

An apparatus and method for operating a communication device on two networks. A wireless wide area network uplink signal can be detected from a proximal wireless device. A message can be sent to a wireless wide area network infrastructure in response to detecting the wireless wide area network uplink signal, the message indicating the wireless device is proximal to a wireless local area network access point. The proximal wireless device can be communicated with using wireless local area network communication signals.

16 Claims, 4 Drawing Sheets

APPARATUS AND METHOD FOR OPERATING A COMMUNICATION DEVICE ON TWO NETWORKS

BACKGROUND

1. Field

The present disclosure is directed to a method and apparatus for operating a communication device on two networks. More particularly, the present disclosure is directed to operating a communication device on a first network and detecting and handing off the communication device when the communication device is proximal to a second network.

2. Description of Related Art

Presently, as demand for access to the Internet increases, the number of access points to the Internet also continues to grow in both the wired and wireless form. Wireless Local Area Network (WLAN) access points such IEEE 802.11, Bluetooth, star topology, mesh topology, and home Radio Frequency (RF) access points can provide access to the Internet and other network types. WLAN access points are proliferating in both the home and in the commercial environment. Devices that typically access the Internet through WLAN access points are laptop computers, handheld or palm top computers, PDA's, desktop computers and the like. The geographical coverage area of a WLAN is generally known as a hot spot. Hot spots can be independent, but may overlap as more WLAN access points are deployed. Even though the RF footprint of a WLAN is much smaller than a wireless Wide Area Network (wireless WAN) cell, such as a radiotelephone network cell, a wireless communication device wide area network cell, or a cellular wide area network cell, a WLAN coverage area and a wireless WAN cell coverage area can overlap. Unfortunately, wireless devices typically can not access both networks or roam between the two.

For example, wireless WAN's operate under one set of standard communication protocols while WLAN's operate under another. Both systems operate in separate independent frequency bands which are specifically assigned to the type of network. Mobile stations that utilize the wireless WAN system generally access multiple cells or base stations as the mobile station moves about geographically. The mobile station is handed off from one cell to another to accommodate the best RF signal reception.

For a variety of reasons, it is envisioned that users can enter into areas where there is radio coverage by both a wireless WAN base station and a WLAN access point. To ensure the best coverage, the wireless device must have the capability to communicate with both the cellular wireless WAN system and the WLAN access point. Thus, devices are being developed to access both the WLAN and wireless WAN networks. This requires the wireless device to scan both frequency bands and look for both networks in order to determine which networks are available. Unfortunately, scanning both frequency bands and looking for both networks requires a significant amount of power resulting in an undesirable level of current drain and decreased operational time of the wireless device between battery charges.

Thus, there is a need for allowing a wireless device that can access both a WLAN and a wireless WAN network while reducing current drain. Also, there is a need for efficiently detecting a wireless device in close proximity to a WLAN. These and other benefits are provided by the present disclosure.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
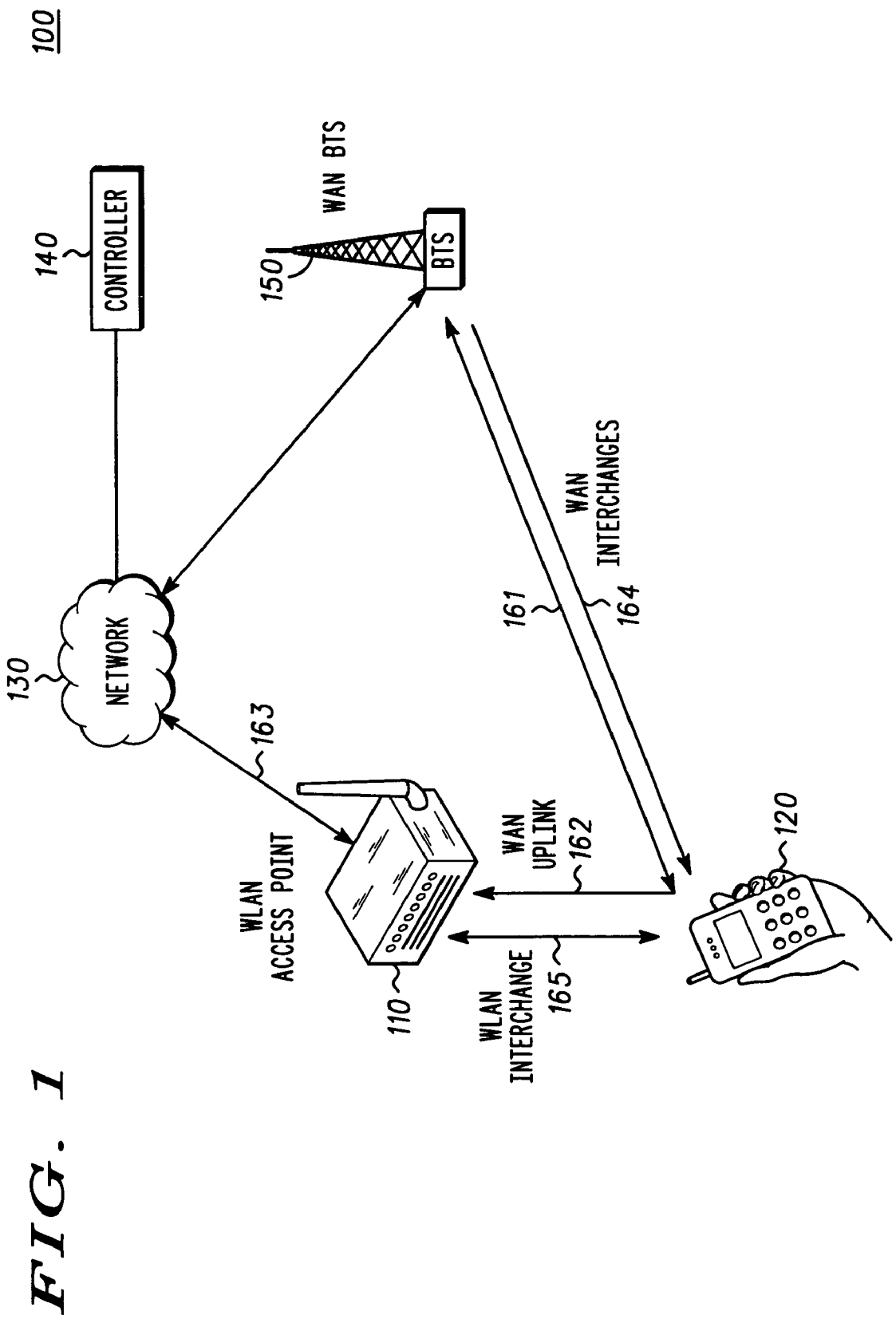
FIG. 1 is an exemplary block diagram of a system according to one embodiment.

FIG. 1 is an exemplary block diagram of a system 100 according to one embodiment. The system 100 can include a network controller 140, a network 130, a terminal 120, a wireless local area network (WLAN) access point 110, and a wireless wide area network (wireless WAN) base station 150. The terminal 120, such as a wireless device, may be a telephone, a wireless telephone, a cellular telephone, a personal digital assistant, a pager, a personal computer, a mobile communication device, or any other device that is capable of sending and receiving communication signals on a WLAN and a WAN.

In an exemplary embodiment, the network controller 140 is coupled to the network 130. The network controller 140 may be located at a base station, at a radio network controller for a wireless WAN infrastructure, or anywhere else on the network 130. The network 130 may include any type of network that is capable of sending and receiving signals, such as wireless signals. For example, the network 130 may include a wireless WAN infrastructure, such as a wireless telecommunications network, a cellular telephone network, a satellite communications network, and other like communications systems. Furthermore, the network 130 may include more than one network and may include a plurality of different types of networks. Thus, the network 130 may include a plurality of data networks, a plurality of telecommunications networks, a combination of data and telecommunications networks and other like communication systems capable of sending and receiving communication signals.

In operation, the WLAN access point 110 can include, in addition to a WLAN transceiver, a wireless WAN transceiver, such as a wireless WAN receiver, that is capable of monitoring uplink WAN communications from a proximal wireless device, such as the terminal 120. For example, the terminal 120 can be capable of operating on either a wireless WAN or a WLAN. The terminal 120 can come within range of the WLAN access point 110 and thus be proximal to the WLAN access point. For example, the terminal 120 can be operating on, be camped on, or be in an ongoing call on the wireless WAN and can then come within range of the WLAN access point 110.

As another related operational example, line 161 represents the terminal 120 in communication with the wireless WAN infrastructure via the base station 150. Line 162 represents the terminal 120 being within range of the WLAN access point 110. For example, a wireless WAN uplink receiver at the WLAN access point 110 can detect wireless WLAN uplink signals transmitted from the terminal 120 to the base station 150. Line 163 represents the backhaul between the WLAN access point 110 and the network 130, which can provide communications between the two. In this way, the WLAN access point 110, having detected the proximal terminal 120, can send a message to the wireless WAN infrastructure, such as the controller 140. Identification of the terminal 120 can be done in any number of ways. For example, identification can be done either in the WLAN access point 110, in the WAN infrastructure controller 140, in conjunction with both, or actually not at all. For discussion purposes, it can be assumed that the WAN infrastructure controller 140 identifies the proximal terminal 120. Line 164 represents the WAN infrastructure controller 140 sending, via the base station 150, a message to the terminal 120 which causes the terminal 120 to initiate searching for, interconnecting with, and/or handing off to the nearby WLAN access point 110. This can be done using known discovery methods and messaging protocols. Line 165 represents the terminal 120 wirelessly communicating with the WLAN access point 110.

According to another embodiment, it can be likely that a terminal 120 that is proximal to the WLAN access point 110 and that is transmitting on the wireless WAN uplink will have very high signal strength at the access point 110. Therefore, it can be easy to detect, and identify, the terminal 120, if desired. Identification of the particular terminal 120 can be done in several ways, by looking at and analyzing the transmitted signal, by sending some identified or detected information to the wireless WAN infrastructure, or by other known methods. For example, the WLAN access point 110 can obtain identification information from data transmitted by the terminal 120 and communicate this to the controller 140. This can be signal signature information about the terminal 120, such as a spreading code, a user ID, or a synchronization code. The WAN uplink signal can be augmented to facilitate detection and user identification by the access point 110.

Alternatively, the WLAN access point 110 can supply captured information and send, to the controller 140, some of the data transmitted by the terminal 120. A simple correlation between what the WLAN access point 110 receives and what the wireless WAN infrastructure has received, and therefore knows what was transmitted, can uniquely identify the terminal 120. It can be further possible to allow a wireless WAN receiver in the WLAN access point 110 that can receive the wireless WAN downlink to allow synchronization. This information can facilitate the WLAN access point's 110 receiving of the terminal's 120 uplink wireless WAN signal and the terminal's 120 identification determination.

It is not necessary to identify the particular terminal 120 being received, since if the wireless WAN infrastructure can send a message to a small or large set of potential proximal subscribers to search for a WLAN, it may only be a temporary condition. If the terminal 120 does not find a WLAN access point, the terminal 120 can quickly return to a low power non-searching mode. Once a terminal 120 finds a WLAN, it can stick there until it moves away or out of the WLAN access point's 110 proximity. Also, it can be possible to keep a terminal that does not have WLAN capability, who is determined based on class codes, data base information or the like, from blinding a wireless WAN receiver at a WLAN access point 110 by preferentially moving such terminals, based on class codes, data base information, or the like, to wireless WAN channels that the WLAN access point 110 is not monitoring.

The wireless WAN infrastructure can have a direct connection to the WLAN access point 110 via the network 130, so control and parameter information can be shared. For example, the WLAN access point 110 can be told the codes and synchronization parameters for likely proximal terminals. All of the operations of the present disclosure can be done with a global system for mobile communication (GSM) WAN, a code division multiple access (CDMA) WAN, a time division multiple access (TDMA) WAN, or any other wireless WAN using similar and corresponding methods. Thus, a low power mechanism can be used to hand off a terminal 120 from a wireless WAN to a WLAN using WLAN access point detection of the terminal's 120 WAN transmissions.

Figure 2:
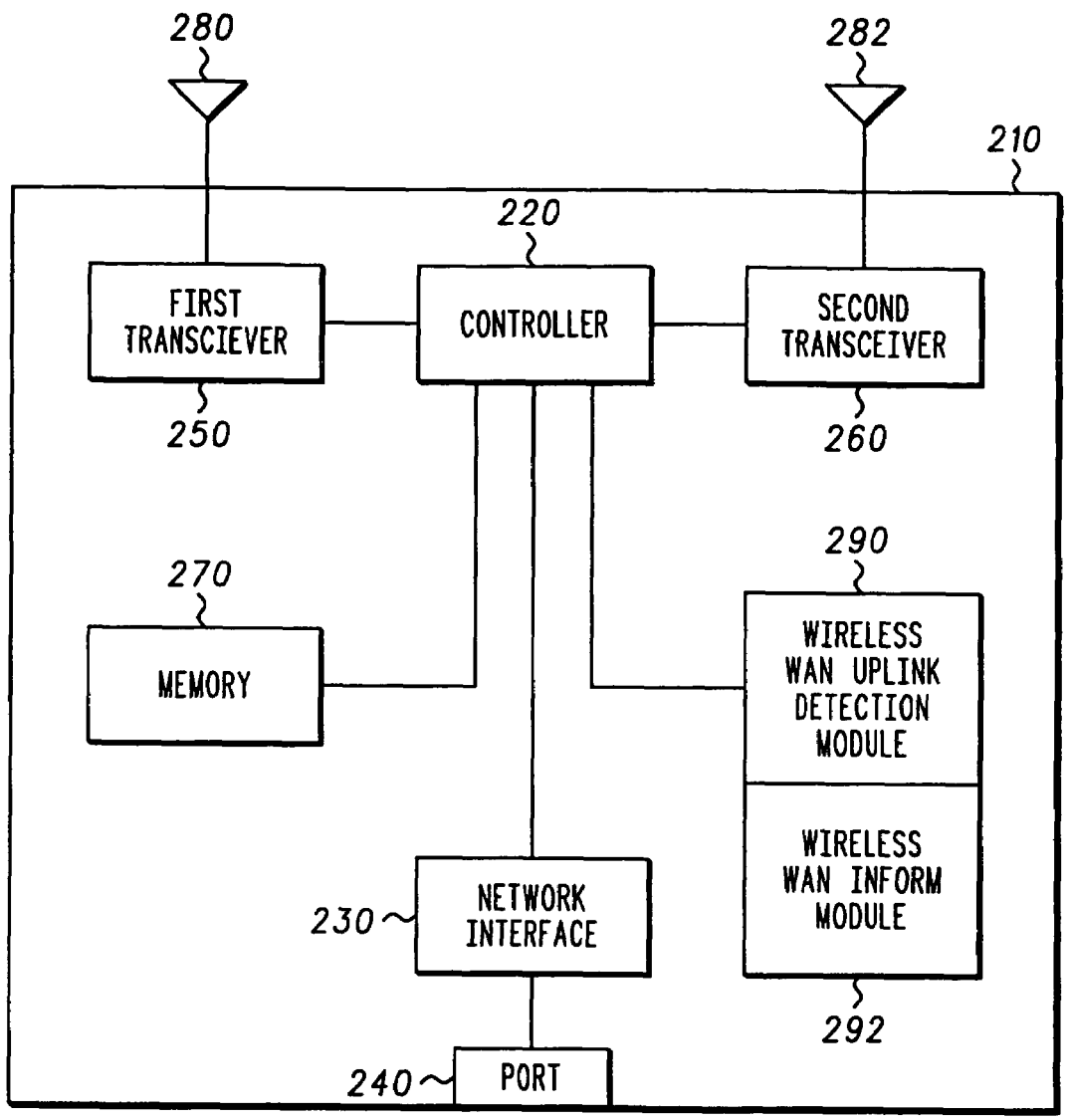
FIG. 2 is an exemplary block diagram of a wireless local area network access point according to one embodiment.

FIG. 2 is an exemplary block diagram of a WLAN access point 200, such as the WLAN access point 110, according to one embodiment. The WLAN access point 200 can include a housing 210, a controller 220, a network interface 230 coupled to the controller 220, a port 240 coupled to the network interface 230, at least one transceiver, such as the first transceiver 250 and/or the second transceiver 260, both coupled to the controller 220, a memory 270 coupled to the controller 220, and at least one antenna, such as antenna 280 and/or antenna 282 coupled to the housing 210 and the first transceiver 250 and/or the second transceiver 260. According to another related embodiment, the WLAN access point 200 can also include a wireless WAN uplink detection module 290 for detecting a wireless WAN uplink signal and a wireless WAN information module 292 for informing a wireless WAN infrastructure of the detection of a wireless WAN uplink signal. The wireless WAN uplink detection module 290 and the wireless WAN information module 292 can be coupled to the controller 220, can reside within the controller 220, can reside within the memory 270, can be autonomous modules, can be software, can be hardware, or can be in any other format useful for a module on a WLAN access point 200.

The memory 270 may include a random access memory, a read only memory, an optical memory, or any other memory that can be used in a WLAN access point. The WLAN access point 200 may use just the first transceiver 250 for all functions. Alternately, the WLAN access point 200 can use a second transceiver 260 or more transceivers for different functions of the WLAN access point 200.

The first transceiver 250 can be a WLAN transceiver. The second transceiver 260 can be a WAN receiver. The second transceiver 260 can further include two WAN receivers: a WAN downlink receiver for receiving WAN downlink signals from a base station 150 and a WAN uplink receiver for receiving WAN uplink signals from a terminal 120.

In operation, the network interface 230 can communicate signals with the network 130 including a wireless WAN infrastructure. For example, the network interface 230 can send to and receive information from the network controller 140 via the port 240, such as an Ethernet port coupled to a backhaul to the network 130. The network interface 230 can also communicate with the network controller 140 using any other useful means of communication. The at least one transceiver 250 can detect a wireless WAN uplink signal from a wireless device, such as the terminal 120, and can communicate WLAN signals with the terminal 120. The controller 220 can inform the wireless WAN infrastructure, via the network interface 230, of information relating to a proximal terminal 120 to the WLAN access point 200 in response to the at least one transceiver 250 detecting the wireless WAN uplink signal from the terminal 120.

The at least one transceiver may include a WLAN transceiver, such as the first transceiver 250, configured to transmit and receive WLAN signals to and from the terminal 120. The at least one transceiver may also include wireless WAN transceiver, such as the second transceiver 260, configured to detect a wireless WAN uplink signal from the terminal 120. The wireless WAN may be a radiotelephone network or any other type of wireless WAN. For example, the wireless WAN can be one of a wireless communication device WAN, a radiotelephone network, a cellular system, and/or any other wireless WAN. The WLAN can be one of a 802.11 network, a star topology network, a mesh topology network, and/or any other WLAN. The controller 220 can be further configured to inform the wireless WAN infrastructure, via the network interface 230, of a terminal 120 proximal to the WLAN access point 200 based on the wireless WAN uplink signal exceeding a predetermined threshold. For example, the controller 220 can determine a property of the wireless WAN uplink signal, such as a signal strength, a signal-to-noise ratio, or any other property useful for determining a quality of the wireless WAN uplink signal. The controller 220 can then compare the property to a threshold to determine the quality of the wireless WAN uplink signal. The controller 220 can also inform the wireless WAN infrastructure, via the network interface 230, of a terminal 120 proximal to the WLAN access point 200 in response to both the at least one transceiver 250 detecting the wireless WAN uplink signal from the terminal 120, and the at least one transceiver 250 detecting an adequate signal strength of a WLAN link between the proximal terminal 120 and the WLAN access point 200 to engage in WLAN communications. The wireless WAN uplink signal can be one of an ongoing communication transmission from the terminal 120 to a wireless WAN base station 150, a negotiation message from the terminal 120 to the wireless WAN base station 150, a call setup message from the terminal 120 to the wireless WAN infrastructure, or any other wireless WAN uplink signal. The controller 220 can be further configured to engage in communications with the terminal 120 using a WLAN protocol via the at least one transceiver 250 after informing the wireless WAN infrastructure, via the network interface 230, of the terminal 120 proximal to the WLAN access point 200.

Figure 3:
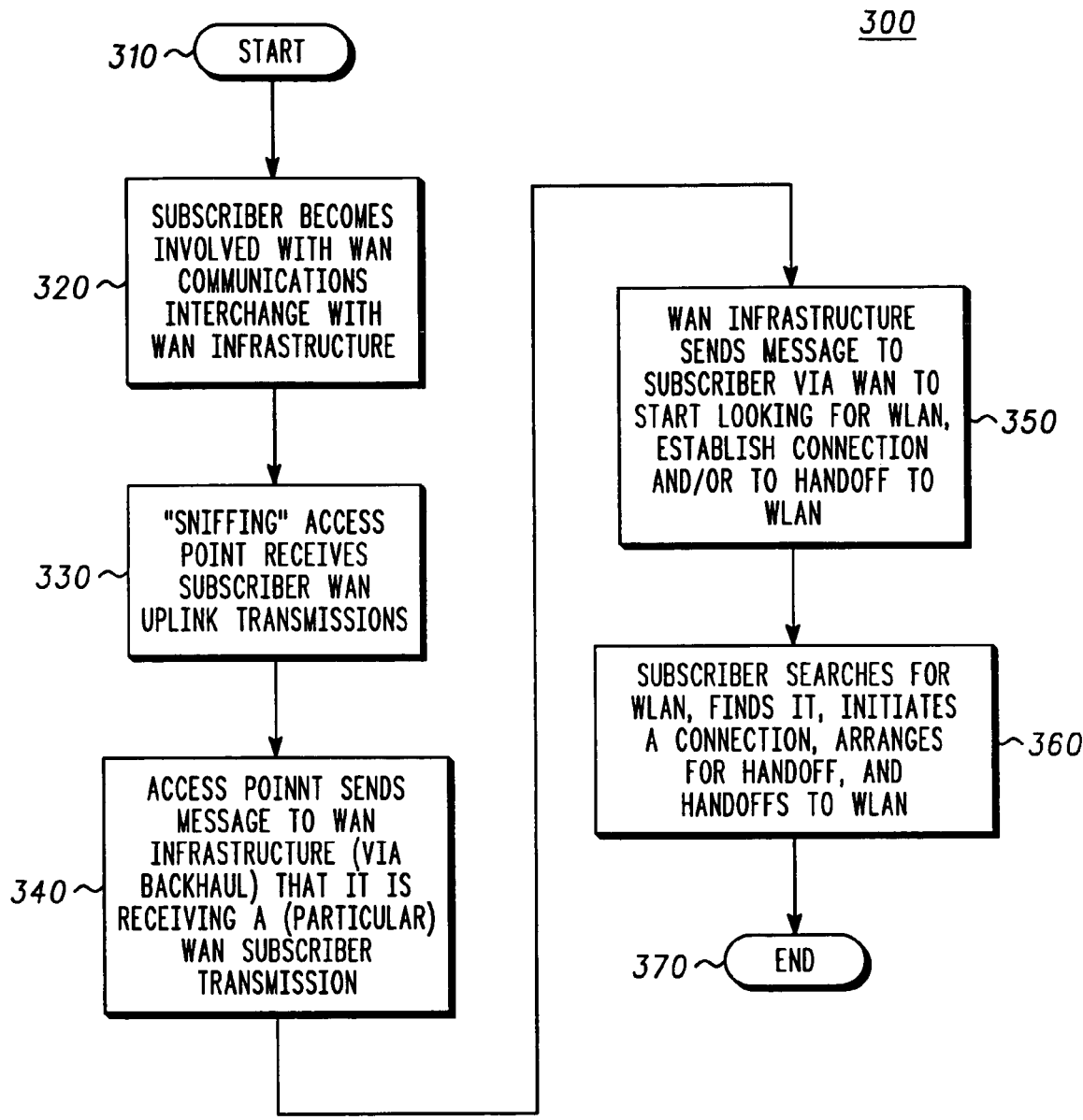
FIG. 3 is an exemplary flowchart illustrating the operation of the system according to one embodiment.

FIG. 3 is an exemplary flowchart 300 illustrating the operation of the system 100 according to another embodiment. In step 310, the flowchart begins. In step 320, a subscriber, such as the terminal 120, can become involved with a wireless WAN communications interchange with a wireless WAN infrastructure. In step 330, the WLAN access point 110 can "sniff" or detect a wireless WAN uplink transmission from the terminal 120. In step 340, the WLAN access point 110 can send a message to the wireless WAN infrastructure via the network 130, such as by sending the network controller 140 a message via a backhaul, informing the wireless WAN infrastructure that it has detected a proximal terminal 120 by receiving a wireless WAN transmission. The message can include additional information to identify or aid the controller 140 in identifying the detected proximal terminal 120. In step 350, the wireless WAN infrastructure can send a message to the terminal 120 via the wireless WAN base station 150 instructing the terminal 120 to start looking for the WLAN access point 110. In step 360, once the terminal 120 has searched for the WLAN access point 110 and found it, the terminal 120 can initiate a connection, arrange for handoff from the wireless WAN system, and/or handoff to the WLAN. It is understood that the handoff negotiation process can occur via signaling between the WAN and the terminal 120 or the WLAN with the access point 110 as an intermediary between the terminal 120 and the network 130. In step 370, the flowchart 300 ends. After transferring to the WLAN, the terminal's 120 information can be communicated to the controller 140 via the network interface 230 and the port 140 via the access point's 110 backhaul 163 to the network 130.

Figure 4:
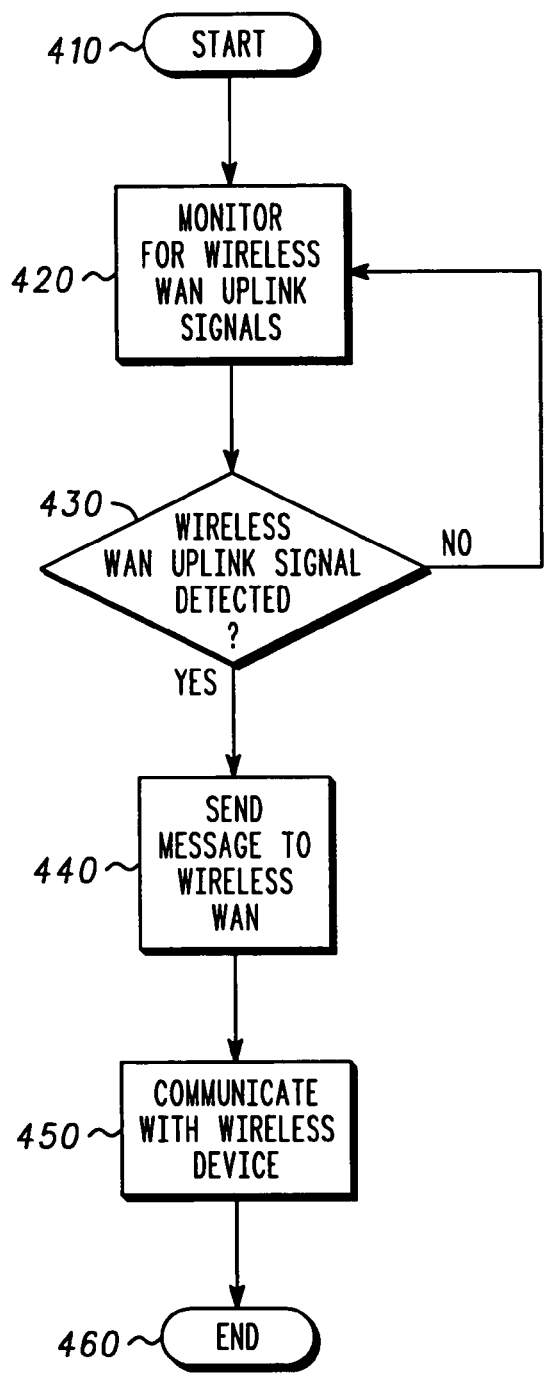
FIG. 4 is an exemplary flowchart illustrating the operation of the wireless local area network access point according to another embodiment.

FIG. 4 is an exemplary flowchart 400 illustrating the operation of the WLAN access point 200 according to another embodiment. In step 410, the flowchart begins. In step 420, the WLAN access point 200 can monitor for wireless WAN uplink signals. In step 430, the WLAN access point 200 can detect a wireless WAN uplink signal from a proximal wireless device, such as the terminal 120. If a wireless WAN uplink signal is not detected, the WLAN access point 200 can continue monitoring for a wireless WAN uplink signal. It is not necessary for the WLAN access point 200 to continually monitor for a wireless WAN uplink signal. For example, a wireless WAN infrastructure, such as the controller 140, can inform the WLAN access point 200 of a possible proximal terminal 120 via the backhaul 163. The WLAN access point 200 can then attempt to detect the wireless WAN uplink signal. In step 440, the WLAN access point 200 can send a message to a wireless WAN infrastructure in response to detecting the wireless WAN uplink signal, the message indicating the terminal 120 is proximal to the WLAN access point 200. Upon detecting the proximal terminal 120, the WLAN access point 110 can inform the controller 140 of the detection via the backhaul 163 and network 130. The WAN infrastructure can send a message to the proximal terminal 120 that it should look for a WLAN access point. The proximal terminal 120 can find the WLAN access point 110 using known discovery techniques and can engage in communication, even while it continues its call over the WAN. In step 450, the WLAN access point 200 can communicate with the proximal terminal 120 using WLAN communication signals. The WLAN access point 200 can receive a handoff of the terminal 120 from the wireless WAN base station 150 to the WLAN access point 200. This transfer of the call from a WAN radio channel to a WLAN radio channel can be accomplished via message signaling between the WAN infrastructure and the proximal terminal 120 via WAN messaging or alternatively by messaging between the terminal 120 and the WAN network via the newly established WLAN communication.

When detecting the wireless WAN uplink signal, the WLAN access point 200 can also determine the proximality of the proximal wireless device. For example, the WLAN access point 200 can determine how close the terminal 120 is to the WLAN access point 200, can determine a quality of a signal from the terminal 120, or can determine the proximality of the terminal 120 by any other useful function. The WLAN access point 200 can then send the message by sending the message to the WAN infrastructure in response to both detecting the WAN uplink signal and determining a sufficient proximality of the proximal terminal 120. As another example, the WLAN access point 200 can determine the proximality of the proximal terminal 120 by detecting a sufficient signal strength of a WLAN link between the proximal terminal 120 and the WLAN access point 200 to engage in WLAN communications. The wireless WAN can be a radiotelephone network. Also, the wireless WAN can be one of a wireless communication device WAN, a radiotelephone network, a cellular system, or the like. The WLAN can be one of a 802.11 network, a star topology network, a mesh topology network, or the like. When detecting the wireless WAN uplink signal, the WLAN access point 200 can receive an identification of the proximal terminal 120. The message sent to the wireless WAN infrastructure in response to detecting the wireless WAN uplink signal can include the identification of the proximal terminal 120. In step 460, the flowchart 400 ends.

The method of this invention is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A wireless local area network access point, comprising:
  a network interface configured to communicate signals with a wireless wide area network infrastructure;
  at least one transceiver configured to detect a wireless wide area network uplink signal from a wireless device and configured to communicate wireless local area network signals with the wireless device, wherein the at least one transceiver comprises: a wireless local area network transceiver configured to transmit and receive wireless local area network signals to and from the wireless device; and a wireless wide area network transceiver configured to detect a wireless wide area network uplink signal from the wireless device; and
  a controller coupled to the network interface and the at least one transceiver, the controller configured to inform the wireless wide area network infrastructure, via the network interface, of a wireless device proximal to the wireless local area network access point in response to the at least one transceiver detecting the wireless wide area network uplink signal from the wireless device.

2. The wireless local area network access point according to claim 1, wherein the wireless wide area network comprises a radiotelephone network.

3. The wireless local area network access point according to claim 1,
  wherein the wireless wide area network comprises one of a wireless communication device wide area network, a radiotelephone network, and a cellular system, and
  wherein the wireless local area network comprises one of a 802.11 network, a star topology network, and a mesh topology network.

4. The wireless local area network access point according to claim 1, wherein the controller is further configured to inform the wireless wide area network infrastructure, via the network interface, of a wireless device proximal to the wireless local area network access point based on the wireless wide area network uplink signal exceeding a predetermined threshold.

5. The wireless local area network access point according to claim 1, wherein the controller is further configured to inform the wireless wide area network infrastructure, via the network interface, of a wireless device proximal to the wireless local area network access point in response to both
  the at least one transceiver detecting the wireless wide area network uplink signal from the wireless device, and
  the at least one transceiver detecting an adequate signal strength of a wireless local area network link between the proximal wireless device and the wireless local area network access point to engage in wireless local area network communications.

6. The wireless local area network access point according to claim 1, wherein the wireless wide area network uplink signal comprises one of an ongoing communication transmission from the wireless device to a wireless wide area network base station, a negotiation message from the wireless device to the wireless wide area network base station, and a call setup message from the wireless device to the wireless wide area network base station.

7. The wireless local area network access point according to claim 1, wherein the controller is further configured to engage in communications with the wireless device via a wireless local area network protocol via the at least one transceiver after informing the wireless wide area network infrastructure, via the network interface, of the wireless device proximal to the wireless local area network access point.

8. A method at a wireless local area network access point comprising:
  detecting a wireless wide area network uplink signal from a proximal wireless device;
  sending a message to a wireless wide area network infrastructure in response to detecting the wireless wide area network uplink signal, the message indicating the wireless device is proximal to the wireless local area network access point;
  communicating with the proximal wireless device using wireless local area network communication signals; and
  determining the proximity of the proximal wireless device, wherein sending a message further comprises sending the message to the wireless wide area network infrastructure in response to both detecting the wireless wide area network uplink signal and determining a sufficient proximity of the proximal wireless device.

9. The method according to claim 8, further comprising receiving a handoff of the wireless device from a wireless wide area network base station to the wireless local area network access point.

10. The method according to claim 8, wherein performing the handoff comprises one of
  receiving a wireless local area network beacon signal, and
  receiving a wireless wide area network beacon signal.

11. The method according to claim 8, wherein determining the proximity of the proximal wireless device comprises detecting a sufficient signal strength of a wireless local area network link between the proximal wireless device and the wireless local area network access point to engage in wireless local area network communications.

12. The method according to claim 8, wherein the wireless wide area network comprises a radiotelephone network.

13. The method according to claim 8,
wherein the wireless wide area network comprises one of a wireless communication device wide area network, a radiotelephone network, and a cellular system, and
wherein the wireless local area network comprises one of a 802.11 network, a star topology network, and a mesh topology network.

14. The method according to claim 8, further comprising receiving an identification of the proximal wireless device.

15. The method according to claim 14, wherein the message sent to the wireless wide area network infrastructure in response to detecting the wireless wide area network uplink signal includes the identification of the proximal wireless device.

16. A wireless local area network access point, comprising:
a network interface configured to communicate signals with a cellular radiotelephone system infrastructure;
a cellular radiotelephone system receiver configured to detect a cellular radiotelephone system unlink signal from a wireless device;
a wireless local area network transceiver configured to communicate wireless local area network signals with the wireless device; and
a controller coupled to the network interface, the cellular radiotelephone system receiver, and the wireless local area network transceiver, the controller configured to inform the cellular radiotelephone system infrastructure, via the network interface, of a wireless device proximal to the wireless local area network access point in response to the cellular radiotelephone system receiver detecting the cellular radiotelephone system uplink signal from the wireless device.

\* \* \* \* \*